United States Patent
Thiessen

(10) Patent No.: US 9,592,773 B2
(45) Date of Patent: Mar. 14, 2017

(54) HEATED PORTABLE TANK FOR CONTAINING WASTE MATERIAL THEREIN

(71) Applicant: Winkler Canvas Ltd., Winkler (CA)

(72) Inventor: Calvin Glen Thiessen, Winkler (CA)

(73) Assignee: WINKLER CANVAS LTD., Winkler, Manitoba (CA)

( * ) Notice: Subject to any disclaimer, the term of this patent is extended or adjusted under 35 U.S.C. 154(b) by 138 days.

(21) Appl. No.: 14/606,637

(22) Filed: Jan. 27, 2015

(65) Prior Publication Data

US 2016/0214791 A1    Jul. 28, 2016

(51) Int. Cl.
*A47J 39/00* (2006.01)
*A47J 41/00* (2006.01)
*B65D 81/38* (2006.01)
*B65D 83/72* (2006.01)
*B60R 15/04* (2006.01)

(52) U.S. Cl.
CPC .................. *B60R 15/04* (2013.01)

(58) Field of Classification Search
CPC ....... B60R 15/04; A47K 11/02; A47K 11/023; E03D 9/00
USPC ....... 220/592.2, 592.01, 577; 4/111.1–111.5, 4/321–323; 296/136.01, 136.1; 219/202
See application file for complete search history.

(56) References Cited

U.S. PATENT DOCUMENTS

| 4,868,932 | A | * | 9/1989 | Thoma | B08B 9/093 134/169 R |
|---|---|---|---|---|---|
| 5,031,249 | A | * | 7/1991 | Sargent | B60R 15/04 4/321 |
| 5,086,800 | A | * | 2/1992 | Dunn | B60R 15/00 137/1 |
| 6,129,117 | A | * | 10/2000 | Eriksson | B60R 15/00 137/899 |
| 6,189,161 | B1 | * | 2/2001 | Rijn | B60R 15/04 4/321 |
| 7,156,574 | B1 | * | 1/2007 | Garst | B60R 15/00 137/181 |
| 2003/0030274 | A1 | * | 2/2003 | Kennedy | E03F 1/008 285/145.5 |
| 2005/0055759 | A1 | * | 3/2005 | Cameron | B60R 15/04 4/321 |

(Continued)

*Primary Examiner* — Jacob K Ackun
*Assistant Examiner* — Rafael Ortiz
(74) *Attorney, Agent, or Firm* — Adrian D. Battison; Ryan W. Dupuis; Ade & Company Inc.

(57) ABSTRACT

A portable tank for storing waste material therein features a flexible bag which is closed and formed from flexible plastic material. The flexible bag includes an internal chamber; a continuous wall enclosing the chamber; and a coupler through the wall that is communicated with the chamber for connecting a hose that pumps the waste material therein. Furthermore, the portable tank features a heating wire arranged to generate heat and a holding structure on the flexible bag, which is arranged to press the wire against the wall for heating the waste material contained therein. The holding structure is a plurality of individual strips which in combination with the continuous wall form respective channels that receive the heating wire therein and guide the wire along the wall. The tank also features an outer covering for enclosing the flexible bag therein, which is made of an insulating material arranged to contain the heat.

13 Claims, 8 Drawing Sheets

(56) References Cited

U.S. PATENT DOCUMENTS

2008/0035654 A1\* 2/2008 Hall ..................... G01F 23/58
220/745

\* cited by examiner

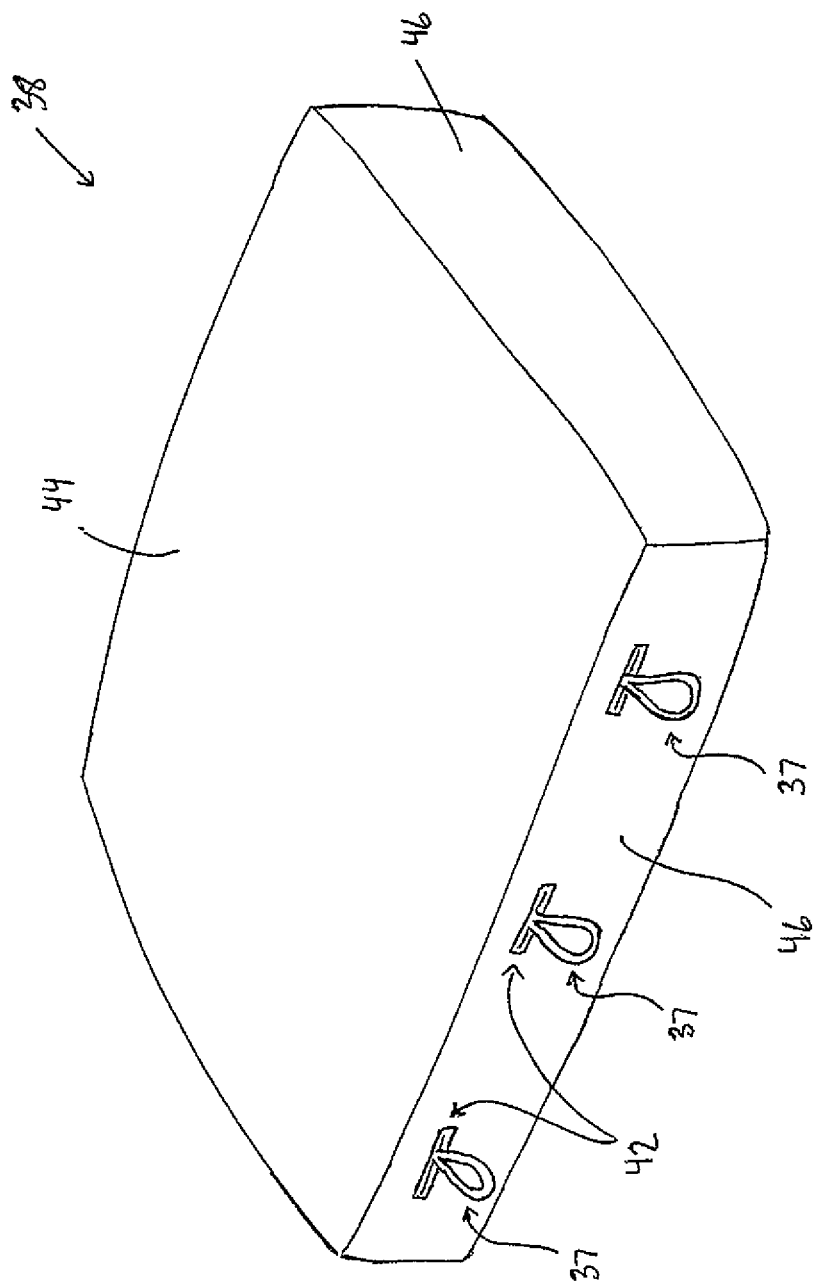

HEATED PORTABLE TANK FOR CONTAINING WASTE MATERIAL THEREIN

FIELD OF THE INVENTION

The present invention relates generally to a portable tank for containing waste material therein, and more particularly the present invention relates to a portable tank comprising a heating element and a holding structure for pressing the heating element against sides of the tank for heating the waste material therein.

BACKGROUND

Holding tanks are containers for storing waste material and may be found in vehicles equipped with toilet facilities, such as recreational vehicles or semi-trucks, or in other trailers used at work sites. The holding tanks store the waste material prior to discharging the waste into a sewage treatment system.

When the vehicles are in areas that experience near and below freezing temperatures, measures are taken to reduce likelihood of freezing of the waste material stored within the holding tank. Tanks containing frozen contents may cause backup of waste throughout the toilet facility and consequent damage to same. Since these types of holding tanks are above ground and consequently may be exposed to the elements, the tanks require heat to be added thereto in order to reduce the likelihood of freezing of the waste because any heat generated by the waste material itself may be insufficient to keep the waste from freezing.

Applicant provides a unique solution for heating holding tanks.

SUMMARY OF THE INVENTION

According to one aspect of the invention there is provided a portable tank for containing waste material therein comprising:
  a flexible bag which is closed and formed from substantially flexible plastic material, the flexible bag comprising:
    an internal chamber for containing waste material therein;
    a continuous wall enclosing the internal chamber, the continuous wall having a lower portion which is arranged to rest on a support surface and an upper portion opposite the lower portion; and
    a coupler through the continuous wall that is communicated with the internal chamber for connecting a hose that pumps the waste material therein;
  a heating element which is arranged to generate heat;
  wherein the flexible bag has a holding structure thereon, the holding structure being arranged to press the heating element against the continuous wall of the flexible bag for heating the waste material contained therein.

The embodiment as described in more detail hereinafter makes use of a heating element to generate heat for reducing likelihood of the waste material contained in the portable tank from freezing. The holding structure on the flexible bag presses the heating element against the continuous wall of the flexible bag, allowing large portions of the heat to be transferred to the continuous wall and internal chamber. The plastic material from which the flexible bag is made affords substantial heat absorption while being substantially resistant to melting from the heating element being pressed against same.

Preferably, the holding structure is a plurality of individual strips which guide the heating element along the upper portion of the continuous wall. Preferably, the plurality of individual strips in combination with the continuous wall form respective channels which receive the heating element therein, an inner portion of each one of the channels being defined by the continuous wall and an outer portion of each one of the channels being defined by the respective one of the individual strips. Preferably, the individual strips are electrically welded to the continuous wall.

It is preferable that the heating element is a heating wire which is elongate and substantially flexible.

Preferably, the heating element is arranged to receive power from an external electrical power source.

It is preferable that the portable tank also includes an outer insulated covering for enclosing the flexible bag therein, the outer insulated covering being enclosed and substantially flexible and having:
  an inner surface which faces the flexible bag so as to surround same, a portion of the inner surface defining a portion of the support surface;
  at least one opening in the outer insulated covering;
  wherein the outer insulated covering is made of an insulating material which is arranged to contain the heat. Preferably, the portable tank further includes a plurality of straps coupled to the continuous wall of the flexible bag at spaced locations along the continuous wall for lifting the portable tank or securing the portable tank to another portion of the support surface for the outer insulated covering. When the portable tank comprises the straps, the at least one opening of the outer insulated covering comprises a plurality of openings, at least a portion of the openings being arranged for passing the straps therethrough for lifting or securing the flexible bag when it is enclosed in the outer insulated covering. It is preferable that the outer insulated covering comprises an upper covering portion which is at least substantially above the upper portion of the continuous wall, the upper covering portion being movable into an open position thereof in which the upper covering portion defines a large opening for placing the flexible bag into the outer insulated covering, and a lower covering portion for resting on the support surface that is opposite the upper covering portion and at least substantially below the lower portion of the continuous wall. Preferably, the outer insulated covering further comprises a plurality of upstanding wall portions spanning between the upper and lower covering portions, the upstanding walls being located about a periphery of each one of the upper and lower covering portions.

Preferably, the portable tank also includes an insulated plug which is arranged to seal the coupler, the insulated plug being made of an insulating material for containing the heat within the internal chamber.

Preferably, the substantially flexible plastic material of the flexible bag is a polyvinyl chloride (PVC) fabric.

Optionally, the portable tank also has a gas release valve which is arranged to effect selective release of gases from within the internal chamber.

Optionally, the coupler comprises a plurality of couplers for connecting more than one hose to the internal chamber.

According to a second aspect of the invention there is provided a method of storing waste material in a portable tank comprising:
  arranging a portable tank for containing waste material therein, which comprises:
    a flexible bag which is closed and formed from substantially flexible plastic material, the flexible bag having:
      an internal chamber for containing waste material therein;

a continuous wall enclosing the internal chamber, the continuous wall having a lower portion which is arranged to rest on a support surface and an upper portion opposite the lower portion; and a coupler through the continuous wall that is communicated with the internal chamber for connecting a hose that pumps the waste material therein;

a heating element which is arranged to generate heat;

wherein the flexible bag has a holding structure thereon, the holding structure being arranged to press the heating element against the continuous wall of the flexible bag for heating the waste material contained therein;

after arranging the portable tank, connecting the heating element to a power source for heating the flexible bag;

connecting a hose to the coupler so as to pump the waste material into the internal chamber.

The embodiment of the second aspect of the invention as described in more detail hereinafter reduces likelihood of freezing of stored waste material by providing a portable tank which has a heating element that generates heat and a holding structure for supporting the heating element on the flexible bag of the tank so that the heat generated by the heating element is transferred to the waste material contained in the flexible bag.

Preferably, the portable tank further comprises an outer insulated covering, the outer insulated covering being enclosed and substantially flexible and having:

an inner surface which faces the flexible bag so as to surround same, a portion of the inner surface being arranged to form the support surface;

at least one opening in the outer insulated covering;

wherein the outer insulated covering is made of an insulating material which is arranged to contain the heat. When the portable tank has the outer insulated covering, the method also includes a step of arranging the outer insulated covering around the flexible bag so as to enclose the flexible bag in the outer insulated covering.

Optionally, the portable tank also has a gas release valve which is arranged to effect selective release of gases from within the internal chamber. When the portable tank has the gas release valve, the method also includes a step of activating the gas release valve for releasing the gases from within the internal chamber.

BRIEF DESCRIPTION OF THE DRAWINGS

One embodiment of the invention will now be described in conjunction with the accompanying drawings in which:

FIG. 8 is a rear perspective view of the portable tank with outer insulated covering in FIG. 7.

In the drawings like characters of reference indicate corresponding parts in the different figures.

DETAILED DESCRIPTION

Figure 1:
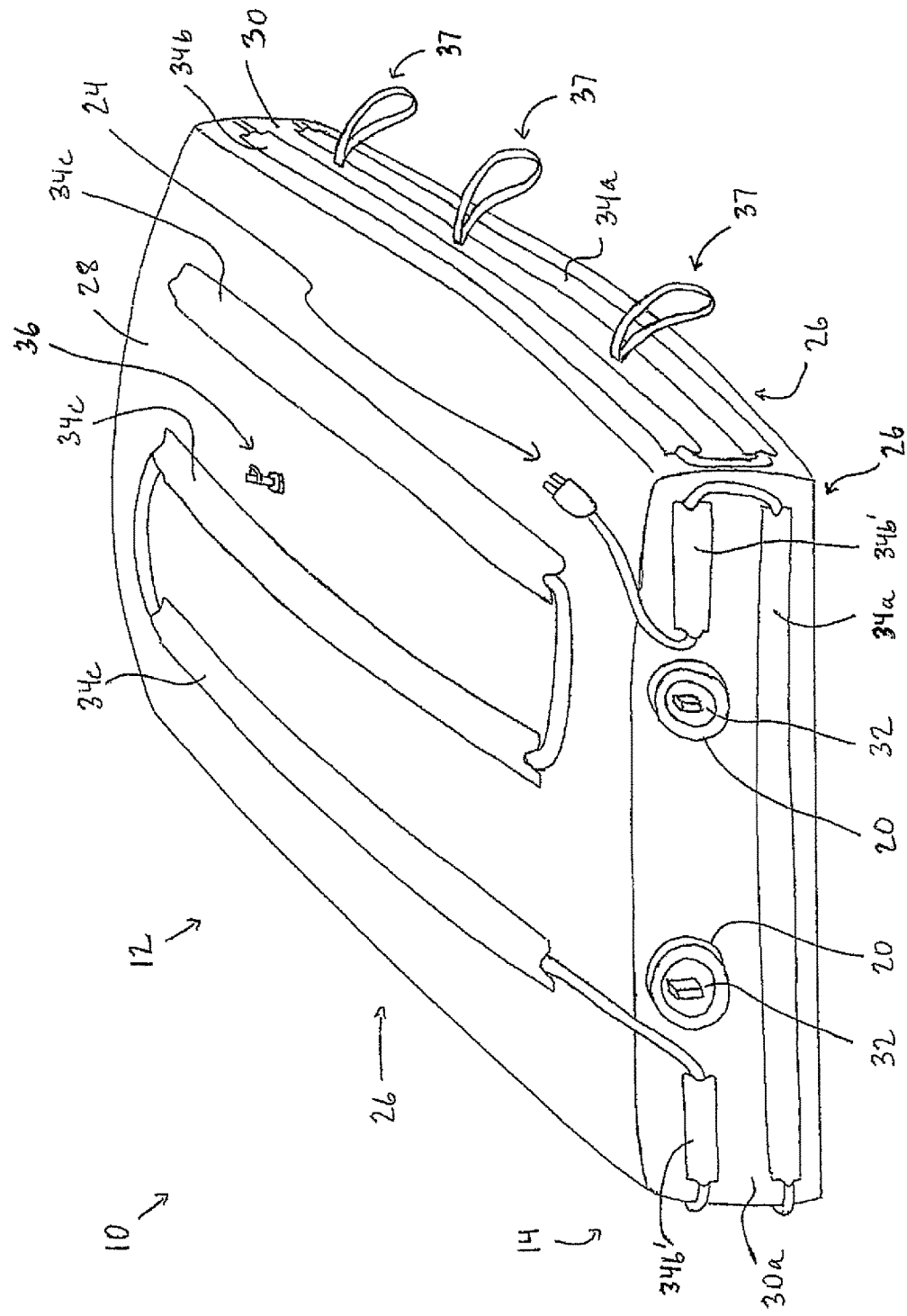
FIG. 1 is a front perspective view of the portable tank without the outer insulated covering.

Referring to the accompanying figures, there is illustrated a portable tank which is generally indicated by reference numeral 10 in FIG. 1. The portable tank is used for containing waste material therein and may serve as a holding tank.

Figure 2:
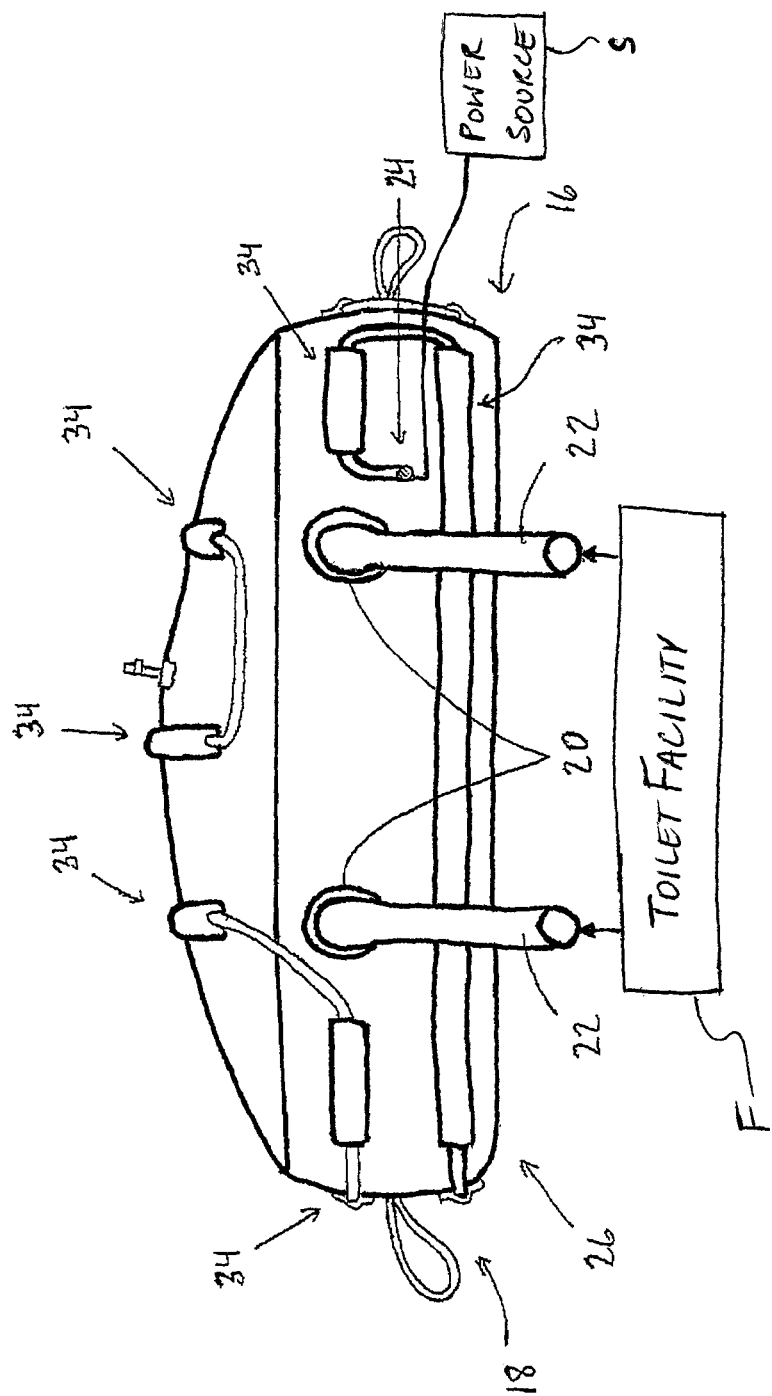
FIG. 2 is a front elevation view of the portable tank in FIG. 1 with hoses connected to the plurality of couplers.

The portable tank generally comprises a flexible bag 12 illustrated in FIG. 1, which is closed and formed from substantially flexible plastic material. The flexible bag comprises an internal chamber for containing waste material therein. The bag also includes a continuous wall 14 enclosing the internal chamber, which has a lower portion 16 arranged to rest on a support surface and an upper portion 18 opposite the lower portion as shown in FIG. 2. Furthermore, the bag has a pair of couplers 20 through the continuous wall that is communicated with the internal chamber for connecting hoses 22 which couple toilet facility F (schematically shown) to pump the waste material into the internal chamber. Further to the flexible bag, the portable tank comprises a heating element 24, which is arranged to generate heat, and a holding structure 26 on the bag, which is arranged to press the heating element against the continuous wall of the flexible bag for heating the waste material contained therein.

Turning our attention to the flexible bag 12 in more detail, the continuous wall 14 of the bag is made of canvas material. The canvas material is durable and affords flexibility of the bag. The flexibility of a structure of the bag in turn affords portability because the bag may be folded into a more compact structure when the internal chamber is empty. The continuous wall may be creased so as to partition the upper portion 18 of the continuous wall into a top section 28 and four upright sections 30, as in the preferred embodiment illustrated in FIGS. 3-6. The upright sections stand upwardly from the lower portion 16 of the continuous wall when the bag contains waste material therein and the lower portion is resting on the support surface. The top section is substantially opposite the lower portion of the continuous wall and spans between the upright sections. It is important to realize that the internal chamber enclosed by the continuous wall does not have a fixed shape. As the chamber is filled with the waste material, the chamber begins to take shape, and this shape is defined by the manner in which the upper portion of the continuous wall is optionally partitioned.

The coupler 20 of the flexible bag is arranged to receive an end of a hose 22 that pumps the waste material into the internal chamber as shown in FIG. 2. In the preferred embodiment, the coupler comprises a pair of couplers for connecting two hoses to the internal chamber. Each one of the pair of couplers is preferably made of high density ethylene plastic. Furthermore, each coupler has center portion which is preferably threaded for attachment of the hose thereto. The pair of couplers is spaced apart on a first one 30a of the upright sections of the continuous wall; for ease of reference, the first upright section defines one longitudinal end of the flexible bag. Each one of the couplers has an insulated plug 32, shown in FIG. 1, which is arranged to seal the respective coupler when a hose is not connected thereto. The insulated plug is made of an insulating material for containing the heat within the internal chamber, especially the heat that may tend to escape through passage ways through the continuous wall that are defined by the couplers. The plug comprises a rectangular stub protruding outwardly from a center of the plug to afford removal of the plug from the coupler when the plug is inserted therein.

Turning our attention now to the heating element, the heating element 24 is a heating wire which is elongate and substantially flexible. The heating wire is a single, continuous length of wire as illustrated in FIGS. 3-6. The heating wire is a predominantly resistive electrical element which has a purpose of generating heat when electrical current is passed through the wire. The heating wire receives power from an external electrical power source, schematically shown at S in FIG. 2, as indicated by presence of an electrical plug at one end of the heating wire, which is shown in FIG. 1. Use of the heating wire as a heating element affords flexibility which is especially important to allowing the bag to be folded up.

The holding structure 26 on the flexible bag is a plurality of individual strips 34 which guide the heating wire 24 along the upper portion 18 of the continuous wall as illustrated in FIGS. 3-6. Each one of the individual strips is an elongate strip of canvas. The plurality of individual strips in combination with the continuous wall form respective channels which receive the heating element therein. An inner portion of each one of the channels is defined by the continuous wall, and an outer portion of each one of the channels is defined by the respective one of the individual strips. The channels are open at each one of respective channel ends. As such, each one of the channels guides a portion of the heating wire along the upper portion of the continuous wall. A structure of the holding structure as described above presses the heating wire against the upper portion of the continuous wall so that the heating wire transfers a majority of the heat generated thereby to the flexible bag, with a substantially smaller portion of the heat generated by the heating wire being lost as waste heat to surroundings of the flexible bag.

The individual strips 34 are arranged about the upper portion 18 of the continuous wall in rows along the top 28 and upright 30 sections thereof. When the internal chamber has the waste material contained therein so that the flexible bag substantially takes on the shape as illustrated in FIGS. 3-6, the strips are horizontally oriented and substantially span a length of each one of the sections along which the strips lie. Each one of the upright sections 30 have two sets of strips: lower strips 34a and upper strips 34b. The lower strips 34a substantially lie in a first common horizontal plane which is spaced above the lower portion 16 of the continuous wall so as to be closer to the lower portion than to the top section 28 of the upper portion. The upper strips 34b of the upright sections substantially lie in a second common horizontal plane which is spaced above the first horizontal plane and the lower portion of the continuous wall, yet below the top section of the continuous wall. As such, the upper and lower strips on the upright sections are arranged in vertical rows thereon; the vertical rows are horizontally centered relative to each one of the upright sections. In addition, the respective one of the upper strips on the first upright section 30a, the upright section that comprises the pair of couplers, includes two separate strips 34b'. The two separate strips are located at outer lateral sides of the first upright section between respective couplers and creases where the first upright section meets adjoining upright sections. Top strips 34c along the top section 28 are oriented so as to span longitudinally along the top section and are arranged in lateral rows across same. The top strips include three strips, each pair of strips having equal spacing therebetween; a middle strip is laterally centered on the top section, so that arrangement of the top strips provides substantially uniform heating at the top section of the flexible bag. The strips may be arranged differently along the upper portion of the continuous wall in other embodiments.

Figure 3:
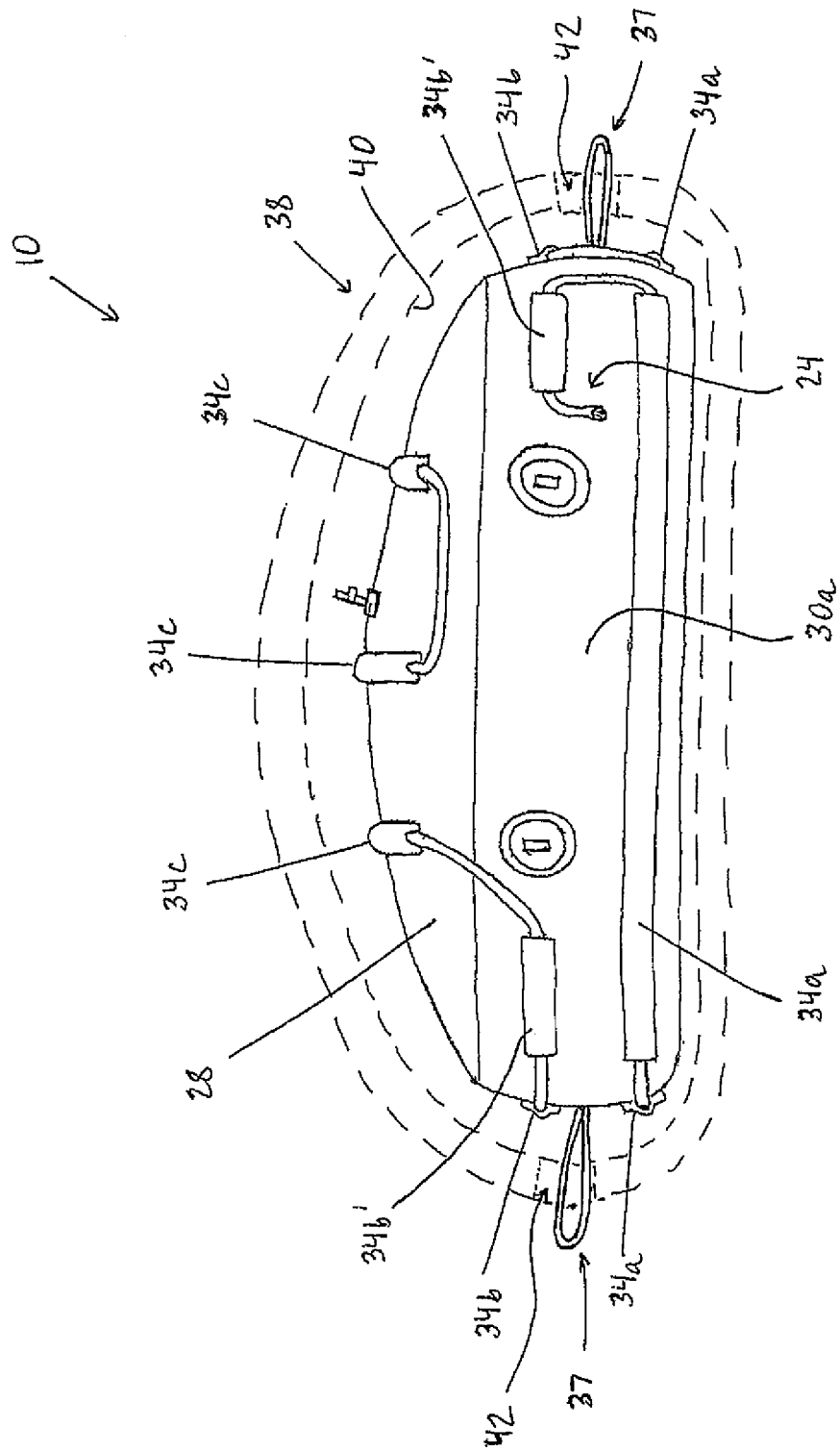
FIG. 3 is a front elevation view of the portable tank in FIG. 1 with a schematic view of the outer insulated covering and a cutaway view of a longitudinal end of the heating wire which has an electrical plug thereon.
Figure 6:
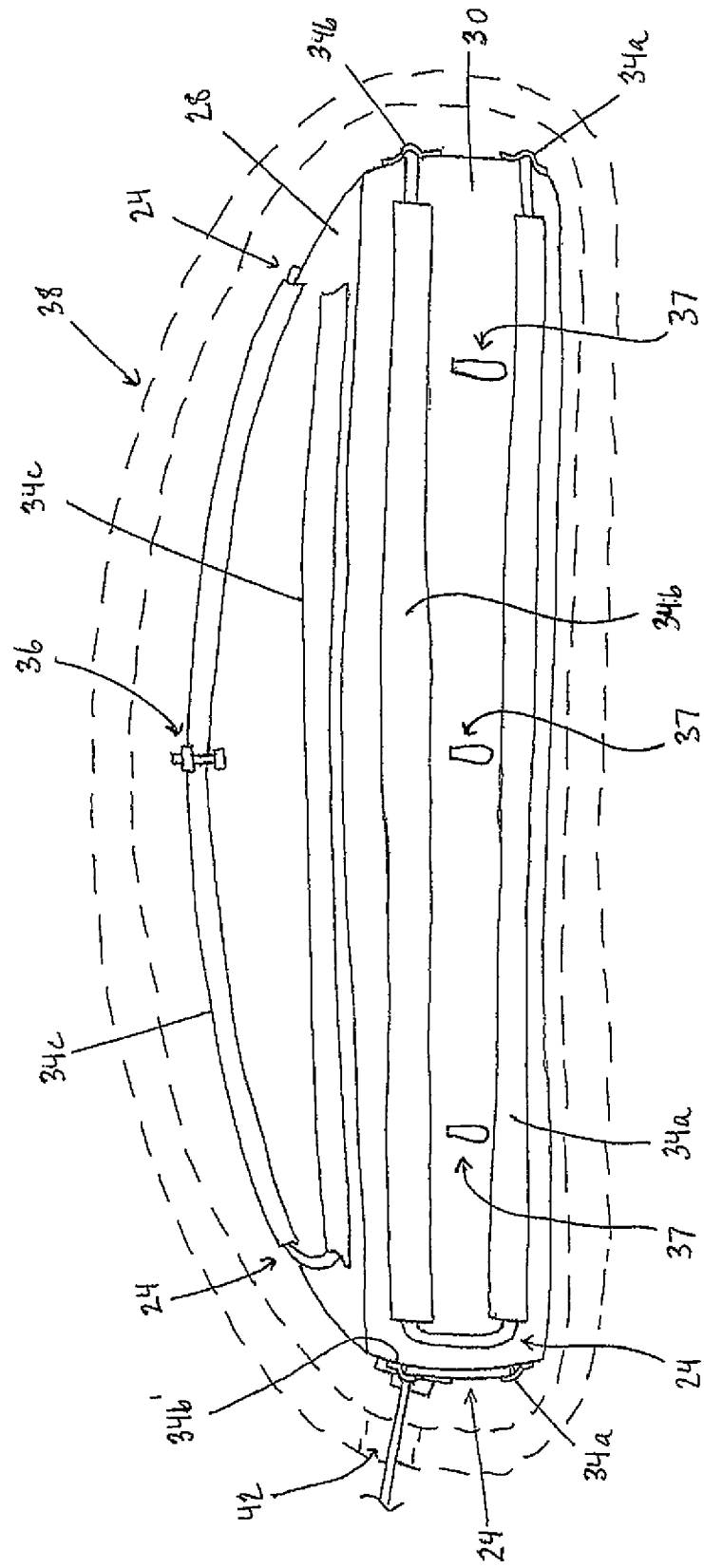
FIG. 6 is a right side elevation view of the portable tank in FIG. 3.

The end of the heating wire 24 which has the electrical plug thereat defines a start of the heating wire. From the electrical plug, the heating wire is guided through the channel of a first one of the separate strips 34b' of the upper strip of the first upright section 30a from an inner end of the separate strip, which is adjacent a respective one 20 within the pair of the couplers, towards an outer end of the separate strip as shown in FIG. 3. Then, the heating wire is guided downwards into the channel of the lower strip 34a of the first upright section at an end of the lower strip immediately below the outer end of the separate 34b' upper strip. From here, the heating wire is fed through each adjacent one of the lower strips of adjoining upright sections in a clockwise direction about a perimeter of the flexible bag so as to span the perimeter in the first horizontal plane, which is illustrated in FIGS. 3-6 when referring to each figure in consecutive order. Once the wire spans an entirety of the perimeter in the first horizontal plane without overlapping any portion of the wire thereat, the heating wire is guided upwards into the channel of the respective upper strip 34b of a last of the four upright sections as illustrated in FIG. 6. Then, the heating wire is guided through each adjacent one of the upper strips of adjoining upright sections in a counter clockwise direction about the perimeter of the flexible bag so as to span the perimeter in the second horizontal plane in a direction about the perimeter opposite to that traversed in the first horizontal plane; the manner in which the heating wire is guided through the upper strips is illustrated in FIGS. 3-6 when referring to these figures in reverse order starting from FIG. 6. When the heating wire is fed through a second one of the separate strips 34b' of the upper strip of the first upright section 30a as in FIG. 3, the heating wire is then fed upward into the channel of a first one of the top strips 34c on the top section 28. Then, the heating wire is guided laterally into the channel of an adjacent strip as in FIG. 5, fed through the adjacent strip, and again guided laterally into the channel of a last of the top strips as in FIG. 3. The heating wire may be guided through the holding structure differently in alternative embodiments.

The portable tank also includes a gas release valve 36 which is arranged to effect selective release of gases from within the internal chamber. The gas release valve is situated in the top section 28 of the upper portion 18 of the continuous wall adjacent to a center of the top section. As the internal chamber is filled with the waste material, waste gases are produced thereby; the gases are periodically released by activating the release valve to reduce likelihood of the flexible bag bursting.

Figure 4:
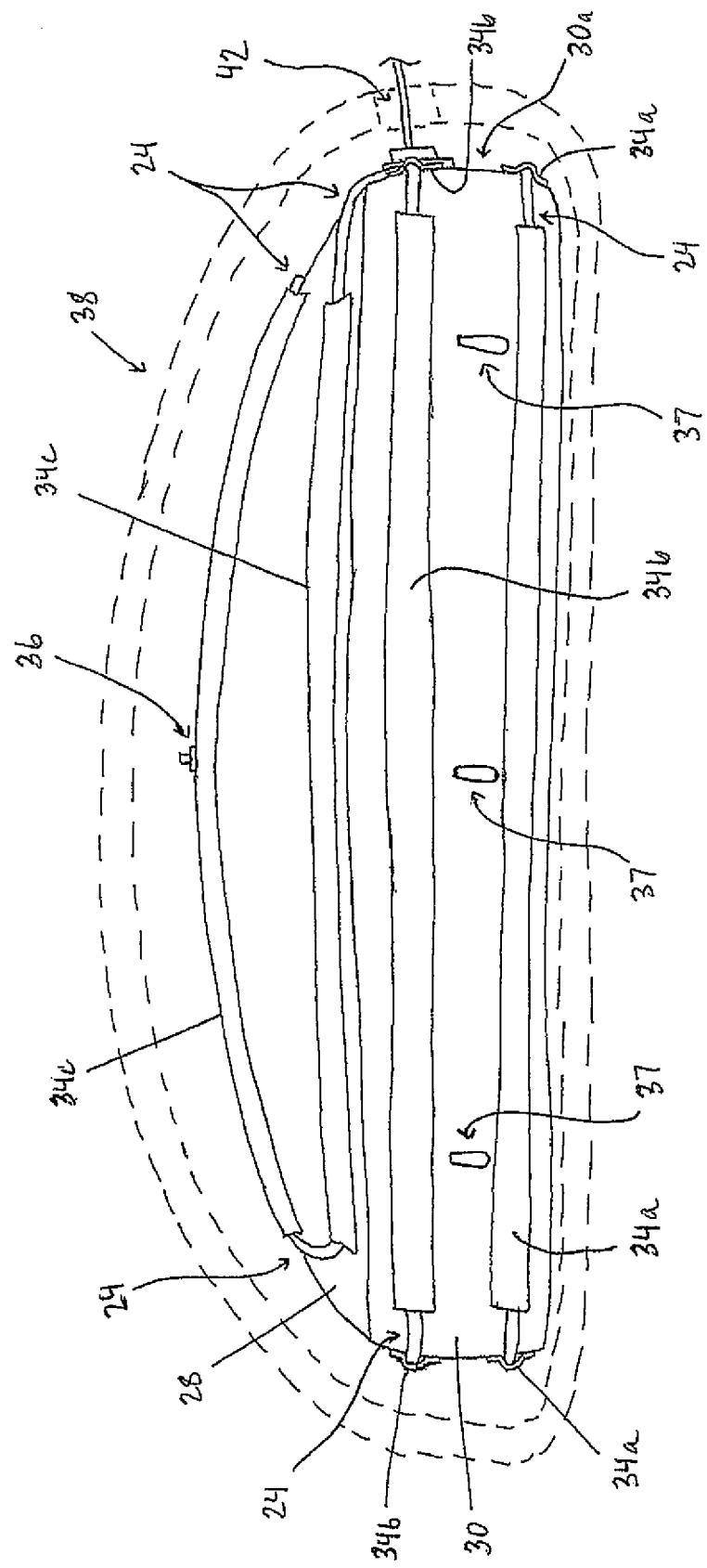
FIG. 4 is a left side elevation view of the portable tank in FIG. 3.
Figure 5:
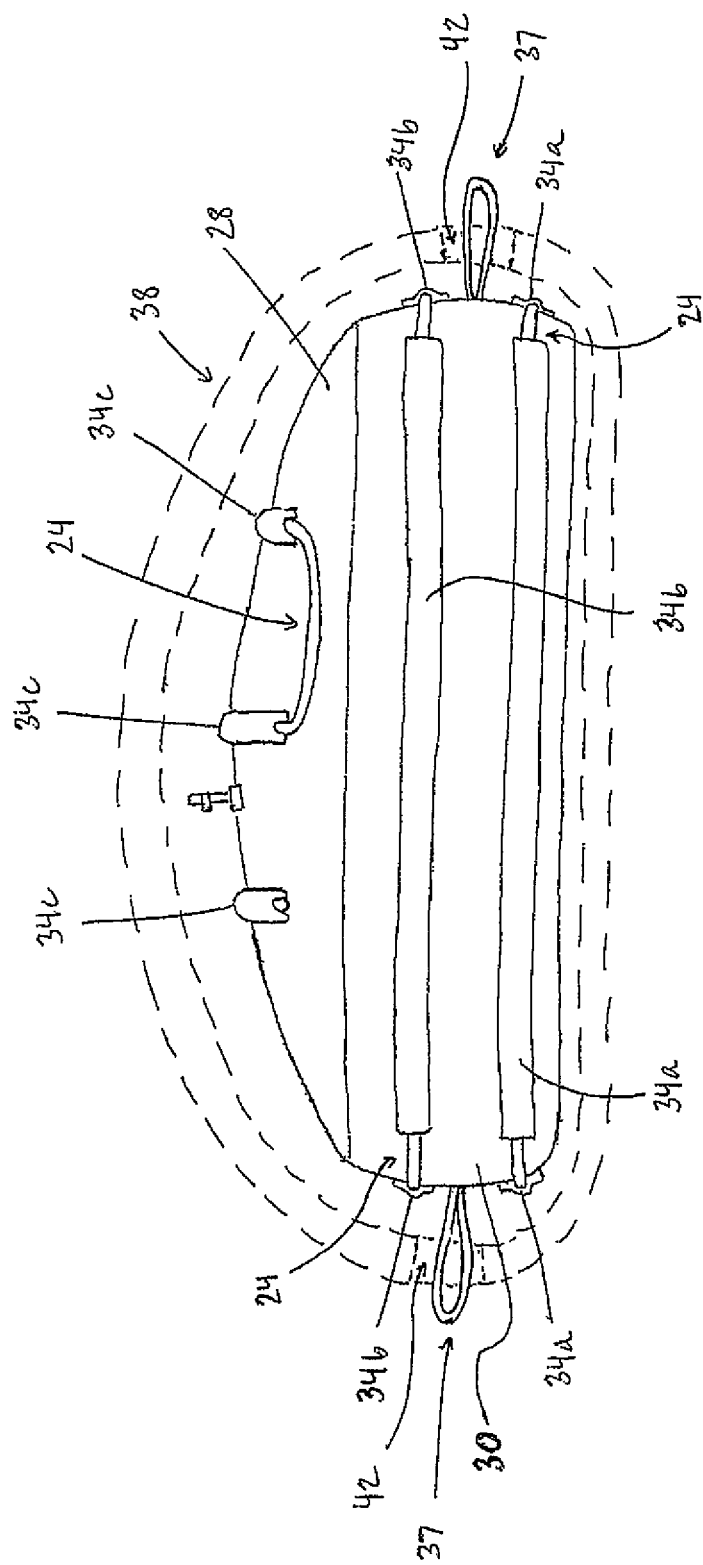
FIG. 5 is a rear elevation view of the portable tank in FIG. 3.

The portable tank further includes a plurality of straps 37. The straps define handles for lifting the portable tank. The straps may also define a mounting portion of the portable tank for securing the flexible bag to the support surface. The straps are located at spaced locations along laterally opposing upright sections of the continuous wall as shown in FIGS. 4 and 6.

As illustrated in FIGS. 3-6, the portable tank further comprises an outer insulated covering 38 for enclosing the flexible bag therein. The outer insulated covering is enclosed and substantially flexible. The outer insulated covering has an inner surface 40 which faces the flexible bag 12 so as to surround same. When the covering encloses the flexible bag, a portion of the inner surface defines a portion of the support surface on which the flexible bag rests. In addition, the outer covering has a plurality of openings 42, shown in FIGS. 4 and 6-8. A portion of the openings is used for passing hoses and a plug of the heating wire 24 through the covering as in FIGS. 4 and 6. Another portion of the openings is used for passing the straps 37 therethough, as in FIGS. 3 and 5, for lifting the portable tank or securing the portable tank to another portion of the support surface, separate to the portion of the support surface defined by the inner surface of the covering, when the outer insulated covering is received over the flexible bag. The openings are slits in the present embodiment. Furthermore, the outer insulated covering is made of an insulating material which is arranged to contain the heat generated by the heating wire. The outer insulated covering preferably comprises two layers of polyethylene material, preferably each having a thickness of about 6 ounces, with thick bonded polyester batting disposed therebetween. Preferably, the thick bonded polyester batting has a thickness between the layers of polyethylene material of about 1".

The outer insulated covering has an upper covering portion 44 which is above the top section of the flexible bag. The upper covering portion is movable into an open position thereof in which the upper covering portion defines a large opening in the outer insulated covering for placing the flexible bag 12 into the outer insulated covering. The outer insulated covering further comprises a lower covering portion for resting on the support surface. The lower covering portion is opposite the upper covering portion and below the lower portion of the flexible bag. Furthermore, a plurality of upstanding wall portions 46 span between the upper and lowering covering portions. The upstanding wall portions are located about a periphery of each one of the upper and lower covering portions. The openings 42 in the outer insulated covering are located in laterally opposing upstanding wall portions so as to be aligned with locations of the straps at the laterally opposing upright sections.

Figure 7:
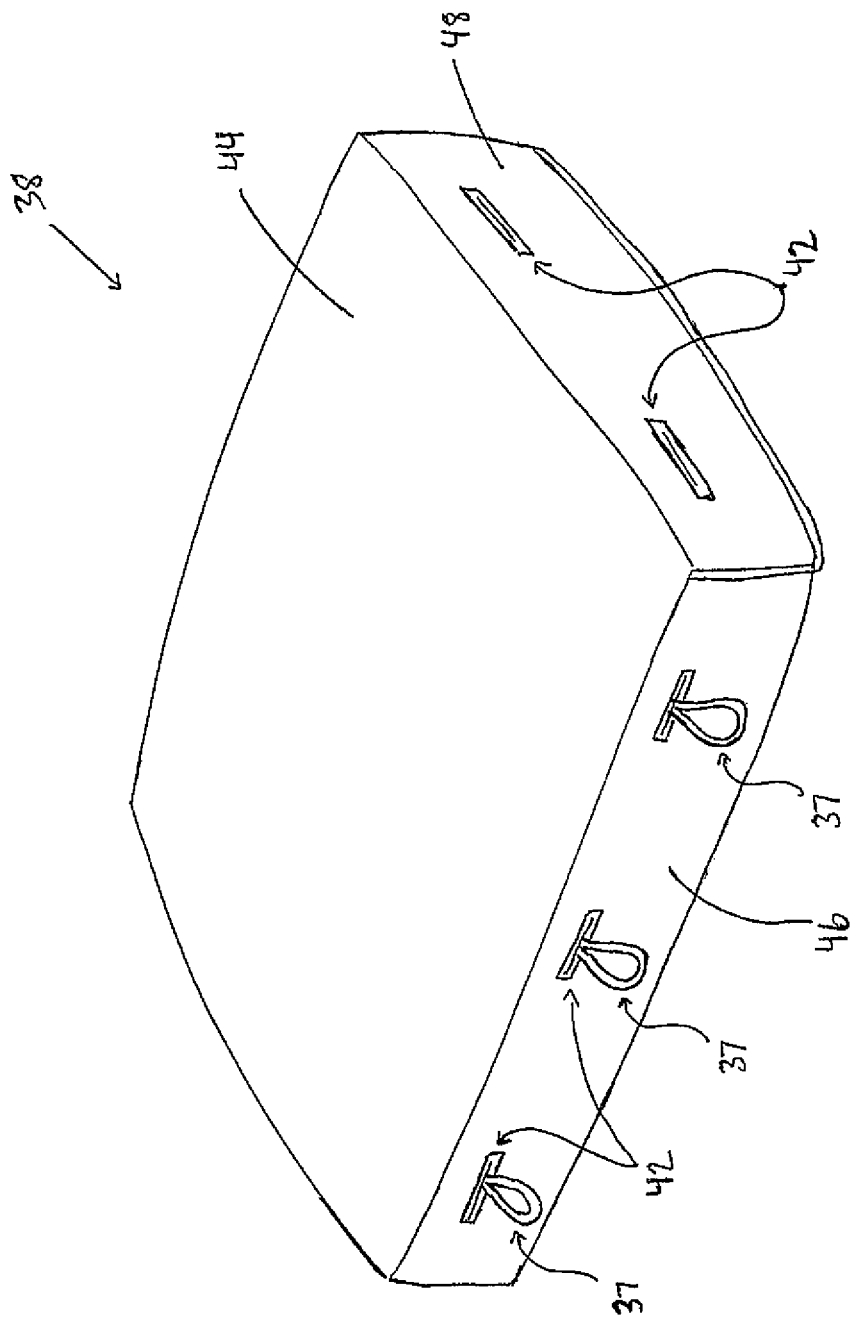
FIG. 7 is a front perspective view of the portable tank with outer insulated covering.

Once the flexible bag is received in the outer insulated covering, the upper covering portion 44 is moved into a closed position thereof shown in FIGS. 7-8 so as to enclose the flexible bag in the covering. The upper covering portion has a flap 48 at its free end which overlaps one of the upstanding wall portions. The flap has clips for securing the upper covering portion to the overlapped upstanding wall portion of the outer insulated covering. Furthermore, the flap has the portion of the openings 42 therein for passing the hoses and heating wire therethough.

The outer insulated covering 38 effectively forms an outer bag in which the flexible bag 12 is placed. As such, the outer insulated covering helps contain the heat, which is generated by the heating wire 24 that is not initially absorbed by the flexible bag 12 or any heat released thereby, in a vicinity around the flexible bag.

In use, the portable tank is initially folded up and stored. In addition, the insulated plugs 32 are inserted in the couplers 20. From a folded state, the flexible bag 12 is unfolded and arranged on the support surface so that an entirety of the lower portion 16 of the continuous wall is resting upon the support surface. Then, the flexible bag may be placed in the outer insulated covering 38, with the upper covering section in the open position. The upper covering section is subsequently moved into the closed position so that the outer insulated covering fully encloses the flexible bag therein. Next, the insulated plugs are removed from within the couplers; the couplers are accessed through the respective portion of the openings in the covering. Note that if any one of the couplers is not to be used, the plug thereof can remain therein. At least one hose 22 is connected to a respective coupler 20 and the waste material is pumped into the flexible bag. The heating wire 24 is connected to the external electrical power source so as to generate the heat for heating the flexible bag. The waste material is also pumped into the bag, and the internal chamber begins to take shape. The hose may be removed after pumping the waste material, and the coupler resealed with the insulated plug placed therein. When the outer insulated covering is used, the covering may alternatively be inserted over the flexible bag after pumping; the straps 37 may be used to lift the flexible bag and place it in the outer insulated covering. Additionally, the gas release valve may be activated so as to release the gases that have built up in the internal chamber. Furthermore, anchors may be used to secure the flexible bag to the support surface, with or without the covering received over it. Alternatively, the straps may be tied down to the support surface to secure the flexible bag.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A portable tank for containing waste material in combination with a toilet facility, the portable tank comprising:
   a closed bag made from substantially flexible material;
   the bag being formed by a continuous wall which encloses an internal chamber where the waste material is received;
   the continuous wall including a lower portion which is arranged to rest on a support surface and an upper portion opposite the lower portion;
   a coupler disposed in the continuous wall through which the internal chamber is communicable with apparatus externally of the bag;
   wherein the toilet facility is operatively connected to the coupler so that the waste material can be pumped into the internal chamber;
   a heating element which is arranged to generate heat;
   and a holding arrangement supported on the continuous wall and arranged to hold the heating element against the continuous wall for heating the waste material received in the internal chamber.

2. The portable tank according to claim 1, wherein the holding arrangement is a plurality of individual strips which guide the heating element along the upper portion of the continuous wall.

3. The portable tank according to claim 2, wherein the plurality of individual strips together with the continuous wall form respective channels which receive the heating element therein, an inner portion of each one of the channels being defined by the continuous wall and an outer portion of each one of the channels being defined by the respective one of the individual strips.

4. The portable tank according to claim 1, wherein the heating element is a heating wire which is elongate and substantially flexible.

5. The portable tank according to claim 1, wherein the heating element is arranged to receive power from an external electrical power source.

6. The portable tank according to claim 1 further comprising an outer insulated covering for enclosing the bag therein, the outer insulated covering being enclosed and substantially flexible and including:
   an inner surface which faces the bag so as to surround same, a portion of the inner surface defining a portion of the support surface;
   at least one opening in the outer insulated covering;

wherein the outer insulated covering is made of an insulating material which is arranged to contain said heat.

7. The portable tank according to claim 6 further comprising a plurality of straps coupled to the continuous wall of the bag at spaced locations along the continuous wall for lifting the bag or securing the bag to another portion of the support surface, and the at least one opening of the outer insulated covering comprising a plurality of openings, at least a portion of the plurality of openings being arranged for passing the straps therethrough for lifting or securing the bag when it is enclosed in the outer insulated covering.

8. The portable tank according to claim 6, wherein the outer insulated covering comprises an upper covering portion which is at least substantially above the upper portion of the continuous wall, the upper covering portion being movable into an open position thereof in which the upper covering portion defines a large opening for placing the bag into the outer insulated covering, and a lower covering portion for resting on the support surface that is opposite the upper covering portion and at least substantially below the lower portion of the continuous wall.

9. The portable tank according to claim 8, wherein the outer insulated covering further comprises a plurality of upstanding wall portions spanning between the upper and lower covering portions, the plurality of upstanding walls being located about a periphery of each one of the upper and lower covering portions.

10. The portable tank according to claim 1 further comprising a plurality of straps coupled to the bag at spaced locations for lifting the bag or securing the bag to the support surface.

11. The portable tank according to claim 1 further comprising an insulated plug which is arranged to seal the coupler, the insulated plug being made of an insulating material for containing said heat within the internal chamber.

12. The portable tank according to claim 1 further comprising a gas release valve which is arranged to effect selective release of gases from within the internal chamber.

13. The portable tank according to claim 1, wherein the coupler comprises a plurality of couplers for connecting more than one hose in communication with the internal chamber.

* * * * *